United States Patent

Barclay

[15] 3,679,814

[45] July 25, 1972

[54] DROPOUT COMPENSATOR FOR COLOR TELEVISION

[72] Inventor: Ralph R. Barclay, Camarillo, Calif.

[73] Assignee: Minnesota Mining and Manufacturing Company, St. Paul, Minn.

[22] Filed: Feb. 16, 1970

[21] Appl. No.: 11,444

[52] U.S. Cl. ....................................178/5.4 CD, 178/6.6 DO
[51] Int. Cl. .......................H04n 5/14, H04n 5/78, H04n 9/02
[58] Field of Search ......................178/6.6 DO, 6.6 A, 5.4 CD

[56] References Cited

UNITED STATES PATENTS 3,463,874 8/1969 Hodge.................................178/6.6 A
3,461,226 8/1969 Carnt...............................178/5.4 CD

*Primary Examiner*—Howard W. Britton
*Attorney*—Smyth, Roston & Pavitt

[57] ABSTRACT

The present invention is directed to an improved dropout compensator for color television that delays a demodulated color video signal by a controlled time interval to provide a delayed color video signal. The luminance information of the delayed color video signal is separated therefrom and applied to an adder. The chrominance information in the delayed color video signal is applied to an automatic phase control to continuously maintain the phase of the chrominance information in phase with the demodulated color video signal. The luminance information and the chrominance information are then added in an adder to provide a dropout compensating signal having the same phase and amplitude as the demodulated color video signal.

The amplitude of the delayed color video signal may be maintained substantially constant by an automatic gain control circuit.

9 Claims, 4 Drawing Figures

INVENTOR:
Ralph R. Barclay

By Smyth, Roston & Pavitt
ATTORNEYS

INVENTOR:
Ralph R. Barclay

By Smyth, Roston & Pavitt
ATTORNEYS

DROPOUT COMPENSATOR FOR COLOR TELEVISION

BACKGROUND OF THE INVENTION

1. Field of the Invention

This invention relates in general to a dropout compensator and more particularly to an improved dropout compensator for providing dropout compensation for color television video signals.

2. Description of the Prior Art

Dropout compensators have been used in color television to provide video information which may be missing from a demodulated color video signal due to a dropout. In the prior art dropout compensators, the video signal from a previous line or lines is stored or delayed a predetermined time, and then the stored information is substituted for the demodulated color video signal lost due to a dropout.

The prior art compensators used for color television separate the luminance and chrominance information into two separate channels and then recombine the outputs of the two separate channels as a dropout compensating signal which is substituted for the demodulated color video signal when a dropout occurs. However, the prior art dropout compensators use a variable delay element to delay either the chrominance information or the luminance information or both that must be preset for the particular use. Typical delay circuits that have been used in the prior art include glass delay lines and other standard delay devices. Since the prior art delay elements are preset for the particular demodulated color video signal and the particular delay required, errors due to drift of the delay lines, circuit components, and video tape recorder time base errors can occur during the operation of the system. Consequently, the prior art devices sometimes have to be manually readjusted to eliminate time errors and drift errors. Errors also have resulted in the prior art because the output of the delayed signal used during a dropout does not have the same amplitude as the amplitudes of the color video signal prior to dropout.

Prior art systems which generally operate on the above principles are disclosed in U.S. Pat. No. 3,347,984, issued Oct. 17, 1967, in the name of Berten A. Holmberg and assigned to Minnesota Mining and Manufacturing Company; in U.S. Pat. No. 3,328,521, issued June 27, 1967, in the name of Irving Moskovitz and assigned to Minnesota Mining and Manufacturing Company; in U.S. Pat. No. 3,461,230, issued Aug. 12, 1969, in the names of Frederick J. Hodge and Ralph R. Barclay, and assigned to Minnesota Mining and Manufacturing Company; and in U.S. Pat. No. 3,463,874, issued Aug. 26, 1969, in the names of Frederick J. Hodge and Ralph R. Barclay, and assigned to Minnesota Mining and Manufacturing Company.

BRIEF SUMMARY OF THE INVENTION

The present invention provides a dropout compensator that continuously automatically provides a dropout compensating signal having the same phase and amplitude as the demodulated color video signal irrespective of any time errors or drift errors. The demodulated color video signal is delayed a particular time interval to provide a delayed color video signal. The amplitude of the delayed color video signal is maintained substantially constant by an automatic gain control. The luminance information of the delayed color video signal is separated therefrom and applied to an adder. The chrominance information in the delayed color video signal is separated therefrom and applied to an automatic phase control to continuously and automatically maintain in the phase of the chrominance information in phase with the demodulator color video signal and applied to the adder. The luminance information is recombined with the chrominance information by the adder which provides a dropout compensating signal. The dropout compensating signal is continuously in phase with the demodulated color video signal irrespective of any time errors or drift errors. The present invention requires no manual adjustments to any of the components for variations in the delay lines of other circuit components.

The invention also provides a system for adjusting the dropout compensation signal so that the amplitude of this signal substantially corresponds to the amplitude of the color video signal. In this way the information supplied during a dropout can correspond in intensity to the information supplied immediately before and after the dropout.

The above and other objects, features and advantage, of the present invention will become apparent with reference to the following detailed description, taken in conjunction with the accompanying drawings, in which:

DESCRIPTION OF THE PREFERRED EMBODIMENTS

Figure 1:
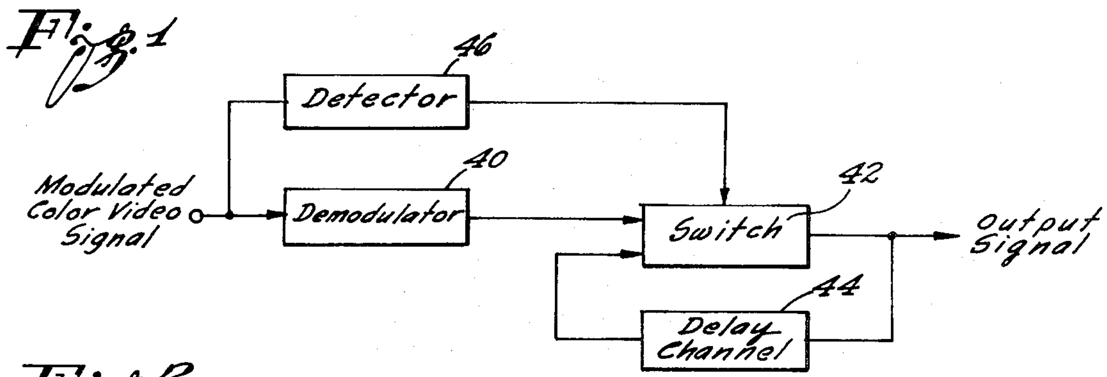
FIG. 1 is a block diagram of a first general form of a dropout compensator constituting the prior art.

Referring now to the drawings wherein like reference characters designate like or corresponding parts, there is shown in FIG. 1 a block diagram of a first general form of a dropout compensator. In the dropout compensator illustrated in FIG. 1, a demodulator 40 is coupled to receive a modulated color video signal. A switch 42 has a first input 41, a second input 43 and a third input 45. The first input 41 of the switch 42 is coupled to receive the demodulated color video signal provided by the demodulator 40 for normally conducting the demodulated color video signal as an output signal. A delay channel 44 is coupled to receive the output signal provided by the switch 42 for processing and delaying the received output signal to provide a dropout compensating signal which is applied to the second input 43 of the switch 42.

A detector 46 is coupled to receive the modulated color video signal for detecting any decreases in amplitude of the modulated color video signal. When the color signal is proper, the color signal passes from the demodulator 40 directly through the output 41 and the switch 42. If the modulated color video signal drops below a predetermined amplitude level, the detector 46 applies a switch pulse to the third input 45 of the switch 42. When the switch 42 receives the switch pulse from the detector 46, the switch 42 changes states such that the dropout compensating signal provided by the delay channel 44 will be conducted by the switch 42 as the output signal. This conduction by the switch 42 of the signal from the delay channel 44 will occur until the cessation of the switch pulse from the detector 46. Consequently, when a dropout occurs in the modulated color video signal, the detector 46 detects the particular dropout and applies to the switch 42 a switch pulse which changes the state of the switch 42 so that a dropout compensating signal provided by the delay channel 44 will be conducted by the switch 42 and therefore substituted for any dropout in modulated and the demodulated color video signal.

Figure 2:
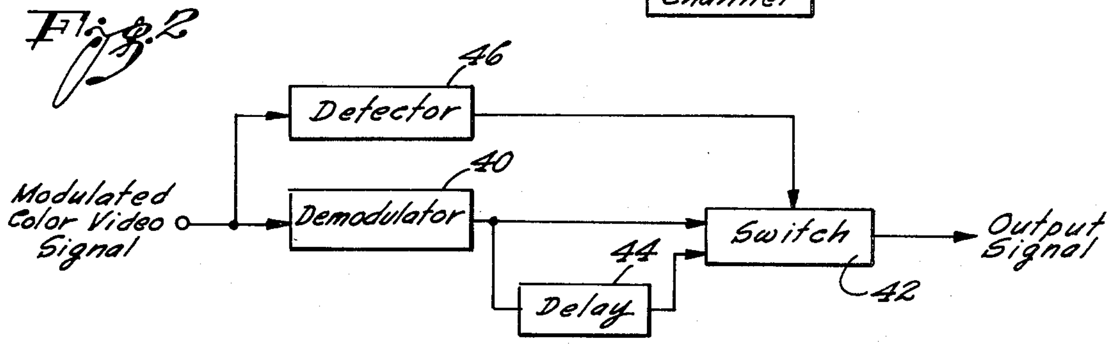
FIG. 2 is a block diagram of a second general form of a dropout compensator constituting the prior art.

Referring now to FIG. 2, there is shown a block diagram of a second general form of a dropout compensator in which the delay channel 44 is coupled to receive the demodulated color video signal provided by the demodulator 40 and to provide a delay in such signal. The delay channel 44 then continuously introduces the delayed signals as a dropout compensating signal to the first input 43 of the switch 42. For example, in color television the delay channel 44 could delay the unmodulated video signal in time by one scan line. The second general form of a dropout compensator illustrated in FIG. 2 operates substantially the same as the first general form of a dropout compensator illustrated in FIG. 1. Consequently, the detector 46 continuously monitors the modulated color video signal. During the time that the modulated color video signal is being properly received, it passes through the input 41 and the switch 45 to the output. However, when the detector 46 provides a switch pulse to the switch 42 when the amplitude of the modulated color video signal drops below a predetermined amplitude level. When the switch pulse is received by the switch 42, the dropout compensating signal provided by the delay channel 44 is conducted by the switch 42 instead of the signal introduced to the switch through the input 41 from the demodulator 46.

As will be appreciated, it is not easy to switch the delayed color signal into the output signal in substitution for the undelayed color signal, upon the occurrence of a dropout, without having phase shifts between the delayed color signal and the undelayed color signal. Such a phase shift is undesirable because it produces in the picture visual distortions which can be detected by a discriminating or fastidious viewer.

Figure 3:
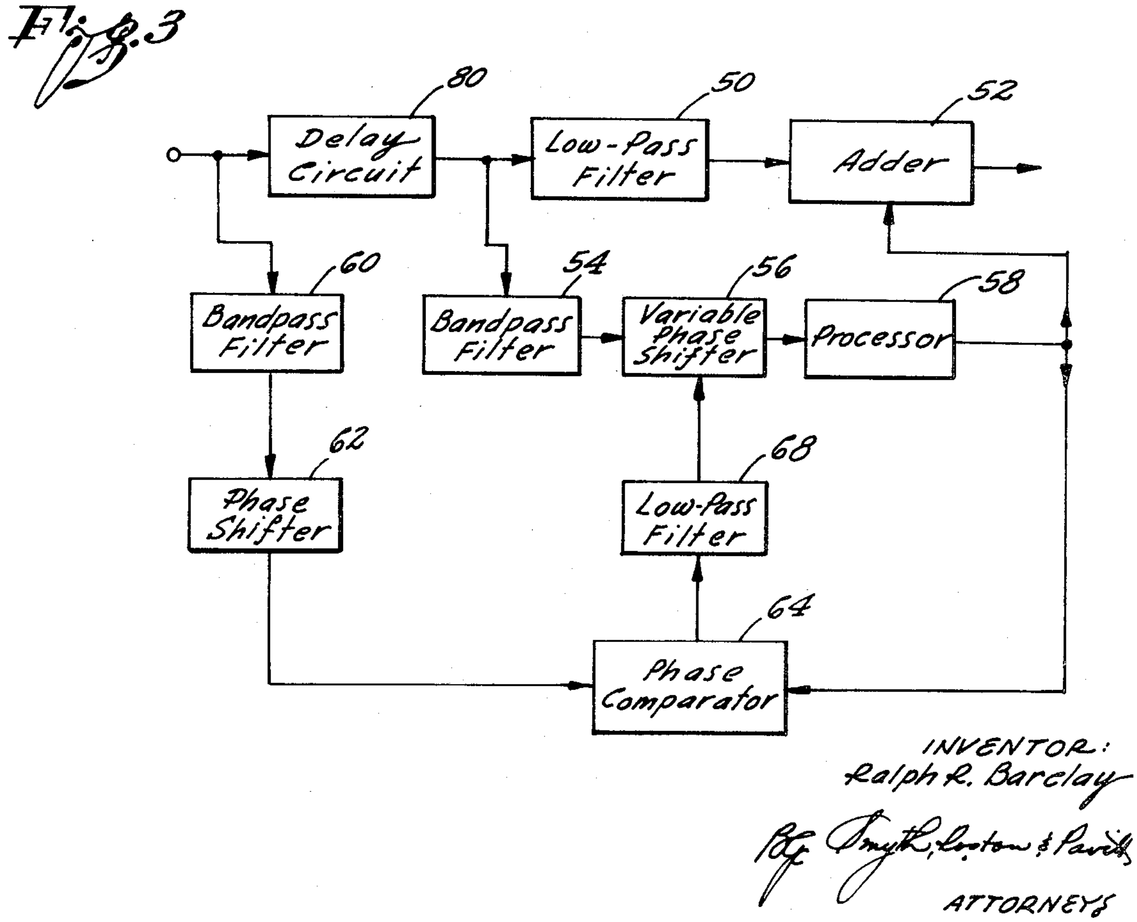
FIG. 3 is a block diagram of a dropout compensator constituting this invention, this dropout compensator including an automatic phase control.

Referring now to FIG. 3, there is shown a block diagram of an automatic phase control that can be used for the delay channel 44 in the first and second general forms of the dropout compensator illustrated in FIG. 1 and FIG. 2. The automatic phase control receives the demodulated color video signal or provides a dropout compensating signal having substantially the same phase and amplitude as the demodulated color video signal. A delay circuit 80 is coupled to receive the demodulated color video signal for delaying the receiver signal a particular time interval for providing a delayed color video signal. The delayed video signal can correspond to the demodulated color video signal except that it is delayed a particular number of horizontal scan lines such as one or two horizontal scan lines.

A low-pass filter 50 having a particular cutoff frequency is coupled to receive the delayed color video signal. The filter 50 attenuates all frequencies above a particular cutoff frequency and conducts all frequencies below the particular cutoff frequency. For example, the low pass filter 50 can have a cutoff frequency of approximately 2.5 megacycles. In this way, the low pass filter 50 has a cutoff frequency for substantially conducting all of the luminance information and substantially attenuating all of the chrominance information. An adder 52 is coupled to receive the luminance information signal conducted by the low pass filter 50.

A bandpass filter 54 is coupled to receive the delayed color video signal for conducting the chrominance information. The bandpass filter 54 has a particular passband determined by an upper cutoff frequency and lower cutoff frequency for conducting all frequencies within the passband while substantially attenuating all frequencies outside the passband. For example, the bandpass filter 54 can have a passband having a lower cutoff frequency of 2.5 megacycles and an upper cutoff frequency of 5.5 megacycles. This passband will substantially include the frequencies of the chrominance information in a color video signal.

A variable phase shifter 56 is coupled to receive the chrominance information passed by the bandpass filter 56 and also to receive an error signal. The variable phase shifter 56 shifts the phase of the received chrominance information a particular phase angle in response to the error signal. For example, if the error signal has a first particular amplitude, the variable phase shifter 56 can shift the phase angle of the received chrominance information signal a first particular phase angle with respect to the phase angle of the chrominance information of the demodulated color video signal. If the error signal has a second particular amplitude, the variable phase shifter 56 can shift the phase angle of the receiver chrominance information signal a second particular phase angle with respect to the chrominance information of the demodulated color video signal.

The variable phase shifter 56 is designed to provide a change of phase angle to the received chrominance information that is required by a processor 58. For example, if the automatic phase control 56 is used in a dropout compensator for NTSC color television, the variable phase shifter 56 would provide an output signal in phase with the delayed color video signal provided by the delay circuit 80 and the processor 58 would shift the phase angle of the received chrominance information 180 degrees.

However, for use in PAL color television application, special processing and phase requirements are required. A typical circuit capable of being used for the variable phase shifter 56 and processor 58 in a PAL color television System is illustrated in U.S. Pat. application Ser. No. 796,082, filed Feb. 3, 1969, in the names of Frederick J. Hodge and Ralph R. Barclay, and assigned to Minnesota Mining and Manufacturing Company, now U.S. Pat. No. 3,586,762.

The output from the processor 58 provides the chrominance signal in a proper phase to the undelayed color signal passing from the demodulator 40 in FIGS. 1 and 2. This chrominance signal is mixed in the adder 52 with the luminance signal from the low-pass filter 50 to provide a dropout compensating signal. When introduced into the output upon the occurrence of a dropout, the signal from the adder 52 will not produce any undesirable effects in the picture being viewed even when this picture is viewed by a discriminating or fastidious person.

A phase error loop is coupled to receive the demodulated color video signal and the processed chrominance information signal for providing the error signal wherein the error signal has an amplitude related to the phase difference between the received signals. This error loop includes a bandpass filter 60, a phase shifter 62, a phase comparator 64 and a low-pass filter 68.

The bandpass filter 60 is coupled to receive the demodulated color video signal for conducting the chrominance information therein. The bandpass filter 60 has a passband determined by an upper cutoff frequency and a lower cutoff frequency. The bandpass filter 60 attenuates all frequencies outside the passband, which corresponds to the passband of the filter 54 and substantially includes all the chrominance information in the demodulated color video signal. The phase shifter 62 is coupled to receive the chrominance information signal conducted by the bandpass filter 60 and to provide the received chrominance information with a particular phase angle in respect to the processed chrominance information signal. The amount of phase shift imparted to the chrominance information by the phase shifter 62 is dependent upon the type of phase comparator 64. For example, if the phase comparator 64 is of the type that requires two received input signals to be 90° out of phase with respect to each other, the phase shifter 62 will provide a phase shift of 90 degrees to the received signal. Accordingly the phase shifter 62 is a phase matching device to provide the phase comparator 64 with a proper phase relationship 64 between the signals introduced to the comparator from the processor 58 and the filter 60.

The phase comparator 64 compares the phase of the received signals to verify the phase relationship and to provide an error signal having an amplitude related to any phase difference between the received signals. A low-pass filter 68 receives the error signal provided by the phase-comparator 64. The filter conducts substantially all frequencies below a particular cutoff frequency and attenuates all frequencies above the cutoff frequency. Furthermore, the low-pass filter 68 substantially integrates the passed frequency signal over a time period corresponding to a particular number of scan lines of the demodulated color video signal. For example, in a television system scanning a line is a time of 63 microseconds, it is desirable to have the low-pass filter 68 integrate the error signal for 150–200 microseconds or approximately the time of three scan lines. By having an integrating type of low-pass filter, rapid corrections in phase shifts are eliminated. Such rapid corrections are undesirable since they tend to introduce jitter into the corrections which are introduced to the pictures when a dropout occurs.

It should be readily understood by those skilled in the art that the block diagram of an automatic phase control illustrated in FIG. 2 could be used for other purposes in connection with the transmission or reception of television signals. The automatic phase control of FIG. 2 could be used in any application in a television system wherein it is desired to maintain an output signal continuously in phase with the input signal.

Figure 4:
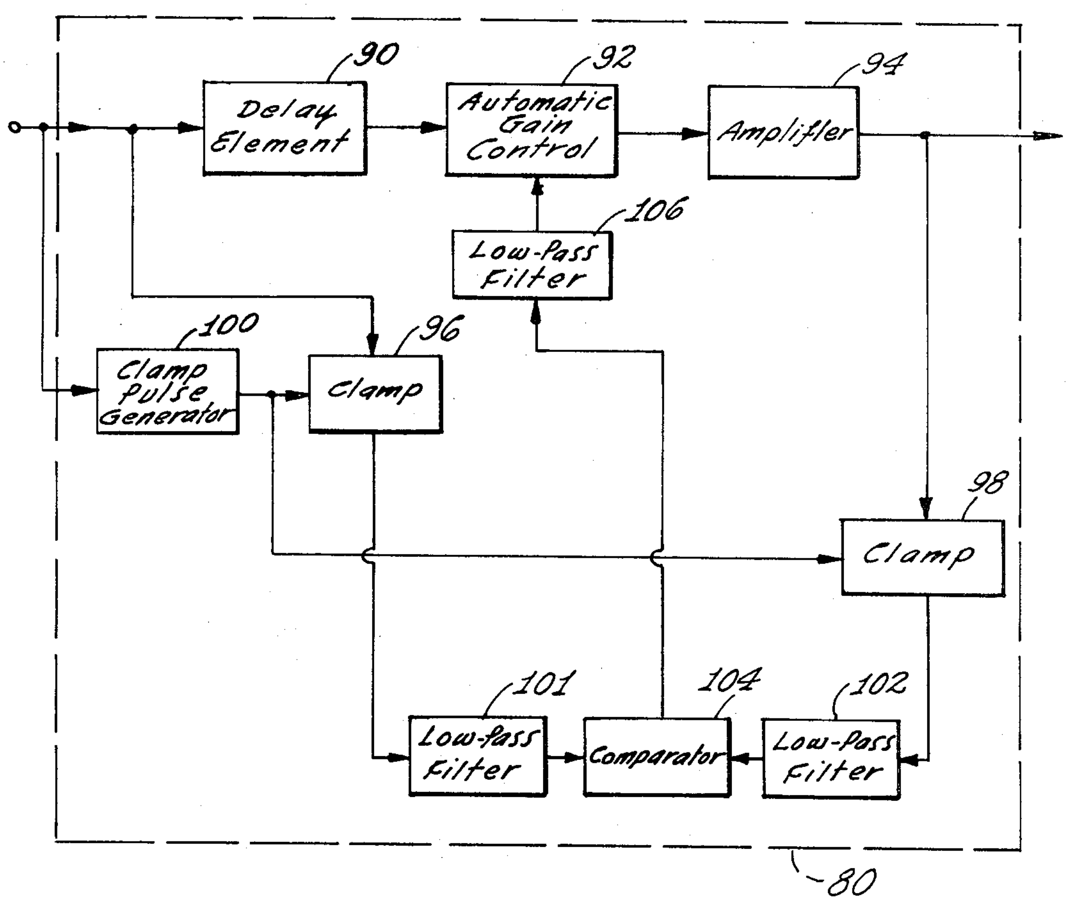
FIG. 4 is a block diagram of one embodiment of an automatic gain control delay circuit which can be included in the dropout compensator shown in FIG. 3.

Referring now to FIG. 4, there is shown a block diagram of an automated gain control that can be used for the delay circuit 80 in the automatic phase control illustrated in FIG. 3. A delay element 90 is coupled to receive the demodulated color video signal for providing a delayed color video signal. This delay may correspond to that provided by the delay circuit 80. As discussed above, the delayed color video signal corresponds to the demodulated color video signal but is delayed a particular time interval relative to the color video signal. For example, the delay element 90 can provide a delayed color video signal equal to the demodulated color video signal but delayed a particular number of horizontal scan lines of a television video signal, such as one horizontal scan line.

An automatic gain control 92 receives the delayed color video signal and a gain control signal for providing an output signal having substantially the same amplitude and frequency components as the demodulated color video signal regardless of variations in the strength of the demodulated color video signal. To provide an automatic change in the amplitude of the output from the automatic gain control 92, the automatic gain control 92 changes the gain of the output signal in response to the gain control signal. For example, when the gain control signal increases in amplitude, the output signal provided by the automatic gain control 92 increases in amplitude. This causes circuits to operate so that the gain control signal decreases in amplitude. As the gain control signal decreases in amplitude, the operation of the automatic gain control 92 becomes stabilized to stabilize the gain of the output signal.

An amplifier 94 is coupled to receive the output signal provided by the automatic gain control 92 and to increase the amplitude of the received signal to a desired level to eliminate any loss in amplitude due to the delay element. In response to the operation of the automatic gain control 92 the output of the amplifier 94 is continuously maintained at substantially the same amplitude as the demodulated color video signal received by delay element 90. Consequently, there is substantially a unitary gain across the delay circuit.

A clamp 96 is coupled to receive the demodulated color video signal and a clamp pulse and to provide an output signal related to the instantaneous amplitude of the demodulated color video signal. A clamp pulse generator 100 provides the clamp pulse wherein the clamp pulse is a repetitious pulse having a repetition rate related to the scan rate of the demodulated color video signal. For example, the clamp pulse generator 100 can provide a clamp pulse each time a SYNC pulse of a color television video signal is produced. The duration of the clamp pulse need not be as long as the duration of the signal pulse.

A clamp 98 is coupled to receive the demodulated color video signal provided by the amplifier 94 and the clamp pulse from the generator 100 and to provide an output signal related to the instantaneous amplitude of the output from the amplifier 94. The clamps 96 and 98 are DC resorting devices or DC setting devices that periodically re-establish a DC level of the clamp output signal. For example, if the demodulated color video signal is a television signal having a black level of 2 volts, clamps 96 and 98 operate to provide a zero DC level upon receiving the clamp pulse from the generator 100 so that the demodulated color video signal returns to black level after the introduction of a SYNC pulse to the generator 100. Consequently, each of the clamps 96 and 98 will periodically re-establish at their respective outputs a reference voltage related to the received signal. The clamps 96 and 98 should have a time constant of at least the duration of one scan line of the demodulated color video signal. The output signal provided by the clamps 96 and 98 will be directly related to the peak-to-peak amplitudes of the respective received signals.

A low-pass filter 101 is coupled to receive the output signal provided by the clamp 96. The low-pass filter 101 has a cutoff frequency for substantially attenuating all frequencies above the particular cutoff frequency and passing all frequencies below the cutoff frequency. A low-pass filter 102 is coupled to receive the output signal provided by the clamp 98. The low pass filter 102 has a cutoff frequency for substantially attenuating all frequencies above the cutoff frequency and passing all frequencies below the cutoff frequency. For example, the low-pass filters 101 and 102 could have a cutoff frequency of 500 KC.

A comparator 104 is coupled to receive the output signal of the low-pass filter 101 and the output signal of the low-pass filter 102 and to verify their amplitude relationship and provide the gain control signal with an amplitude related to any difference between the amplitudes of the received signals. The comparator can be any standard comparator for comparing amplitude signals. A low-pass filter 106 is coupled to receive the gain control signal and to attenuate any frequencies above a particular cutoff frequency. The gain control signal from the low-pass filter 106 is substantially a DC voltage related to the difference in amplitudes between the input signals received by the comparator 104. Accordingly, any differences in amplitude of the demodulated color video signal and the output from the amplitude 96 will produce a change in amplitude of the gain control signal. Changes in amplitude in the gain control signal results in a corresponding change in gain of the automatic gain control 92 so as to rapidly return the amplitude of the amplifier to substantially the same amplitude as that of the demodulated color video signal.

While the salient features have been illustrated and described with respect to a particular embodiment of the present invention, it should be readily apparent that modifications can be made within the spirit and scope of the invention.

I claim:

1. In a system for providing dropout compensation for a demodulated color video signal wherein a dropout compensating signal is substituted for the demodulated color video signal during a dropout, first means coupled to receive the demodulated color video signal for delaying the received signal a particular interval of time to assure a delayed color video signal.

a second means coupled to receive the delayed color video signal for conducting the luminance information of the received signal while substantially attenuating the chrominance information of the received signal.

a third means coupled to receive the demodulated color video signal and the delayed color video signal for phase comparing chrominance information of the received signals for providing a processed chrominance information signal having a particular phase relative to the phase of the chrominance information of the demodulated color video signal, and fourth means coupled to receive the luminance information conductor by said second means and the processed chrominance information signal for adding the received signals to provide a dropout compensating signal, the third means including, a first bandpass filter coupled to receive the delayed color video signal for conducting the chrominance information and for substantially attenuating the luminance information:

a variable phase shifter coupled to receive the chrominance information conducted by the bandpass filter and an error signal for conducting the received chrominance at a particular phase angle in response to the error signal;

a processor coupled to receive the chrominance information conducted by the variable phase shifter for providing a processed chrominance information signal having substantially the same phase angle as the demodulated color video signal;

a second bandpass filter coupled to receive the demodulated color video signal for conducting the chrominance information and for substantially attenuating the luminance information;

a phase comparator coupled to receive the chrominance information conducted by the second bandpass filter and the processed chrominance information signal for providing the error signal related to the phase difference between the received signals.

2. The dropout compensator of claim 1 wherein the third means further includes, a phase shifter coupled to receive the chrominance information conducted by the second bandpass filter for conducting the received signal at a particular phase angle to the phase comparator.

3. The dropout compensator of claim 2 wherein the third means further includes, a low pass filter coupled to receive the error signal provided by the phase comparator for integrating the received signal a predetermined interval of time.

4. In a system for providing dropout compensation for a color video signal wherein a dropout compensating signal is substituted for the color video signal during a dropout, first means for delaying the color video signal a particular interval of time to provide a delayed color video signal, switching means responsive to the color video signal and the delayed color video signal for normally passing only the color video signal and for passing only the delayed video signal upon the introduction of a control signal to the switching means, detector means responsive to the color video signal for providing the control signal upon each occurrence of a dropout and for introducing the control signal to the switching means, comparator means responsive to particular portions of the color video signal and the delayed color video signal for producing a gain control signal in accordance with any differences in amplitude between the color video signal and the delayed color video signal, and second means responsive to the gain control signal for adjusting the amplitude of the delayed color video signal in accordance with the characteristics of such gain control signal.

5. In the system set forth in claim 4, third means for deriving a luminance portion of the color video signal and fourth means for deriving a luminance portion of the delayed color video signal, the comparator means being responsive to the luminance portions from the third and fourth means.

6. In the system set forth in claim 5, the third means including means for clamping the luminance portion of the video signal to a reference level and the fourth means including means for clamping the luminance portion of the delayed color video signal to the reference level.

7. In the system set forth in claim 5, means connected to the comparator means for passing to the second means only the low frequency portion of the gain control signal from the comparator means.

8. In a system for providing dropout compensation for a demodulated color video signal wherein a dropout compensating signal is substituted for the demodulated color video signal during a dropout, first means coupled to receive the demodulated color video signal for delaying the received signal a particular interval of time to assure a delayed color video signal, a second means coupled to receive the delayed color video signal for conducting the luminance information of the received signal while substantially attenuating the chrominance information of the received signal, a third means coupled to receive the demodulated color video signal and the delayed color video signal for phase comparing chrominance information of the received signals for providing a processed chrominance information signal having a particular phase relative to the phase of the chrominance information of the demodulated color video signal, and fourth means coupled to receive the luminance information conductor by said second means and the processed chrominance information signal for adding the received signals to provide a dropout compensating signal, the first means including, a delay element coupled to receive the demodulated color video signal for delaying the received signal a predetermined amount of time, an automatic gain control coupled to receive the delayed output provided by the delay element, and a control signal for providing an output signal that remains substantially constant in amplitude, an amplifier coupled to receive the output signal provided by the automatic gain control for increasing the amplitude of the received signal, a first clamp coupled to receive the demodulated color video signal and a clamp pulse for periodically providing a second referenced voltage, a second clamp coupled to receive the clamp pulse and the output signal provided by the amplifier for providing a second referenced voltage, a comparator coupled to receive the output signal from the said first clamp and the output signal from said second clamp for providing a control signal related to the difference in amplitude of the received signals.

9. In a system for providing dropout compensation for a color video signal wherein a dropout compensating signal is substituted for the color video signal during a dropout, first means for delaying the color video signal a particular interval of time to provide a delayed color video signal, switching means responsive to the color video signal and the delayed color video signal for normally passing only the color video signal and for passing only the delayed color video signal upon the introduction of a control signal to the switching means, detector means responsive to the color video signal for producing the control signal upon each occurrence of a dropout and for introducing the control signal to the switching means, comparator means responsive to particular portions of the color video signal and the delayed color video signal for producing an error signal in accordance with any differences from a particular phase relationship between the color video signal and the delayed color video signal, and second means responsive to the error signal from the comparator means for adjusting the phase of the delayed color video signal in accordance with the characteristics of such error signal, second comparator means responsive to particular portions of the color video signal and the delayed color video signal for producing a gain control signal in accordance with any differences from a particular amplitude relationship between the color video signal and the delayed color video signal, and third means responsive to the gain control signal from the second comparator means for adjusting the amplitude of the delayed color video signal in accordance with the characteristics of such gain control signal.

* * * * *